Dec. 15, 1936.   L. E. LA BRIE   2,064,617
BRAKE
Filed April 23, 1931   5 Sheets-Sheet 1

INVENTOR.
LUDGER E. LA BRIE
BY
Jn. W. McConkey
ATTORNEY.

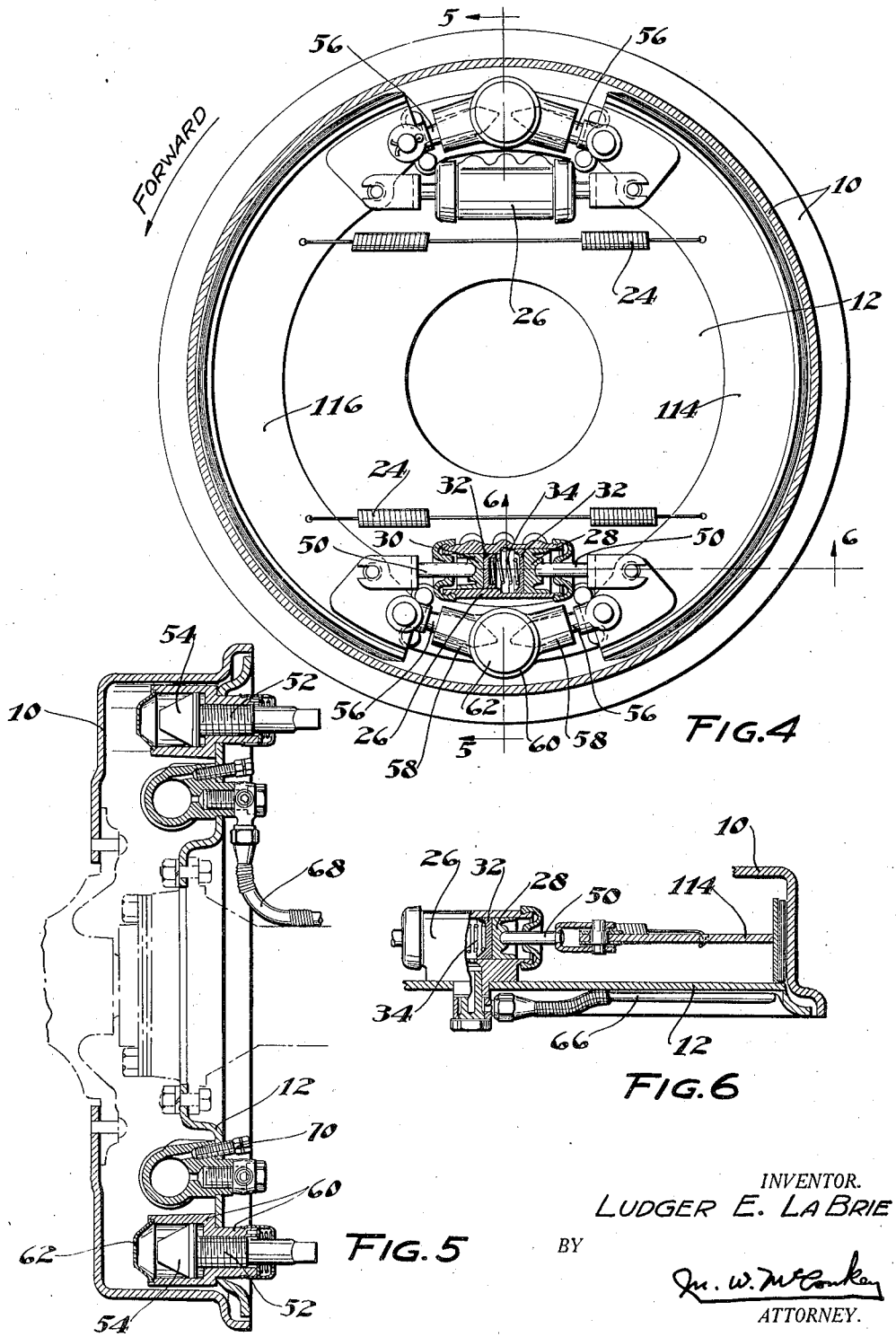

Dec. 15, 1936.  L. E. LA BRIE  2,064,617
BRAKE
Filed April 23, 1931  5 Sheets-Sheet 3

INVENTOR.
LUDGER E. LA BRIE
BY
ATTORNEY.

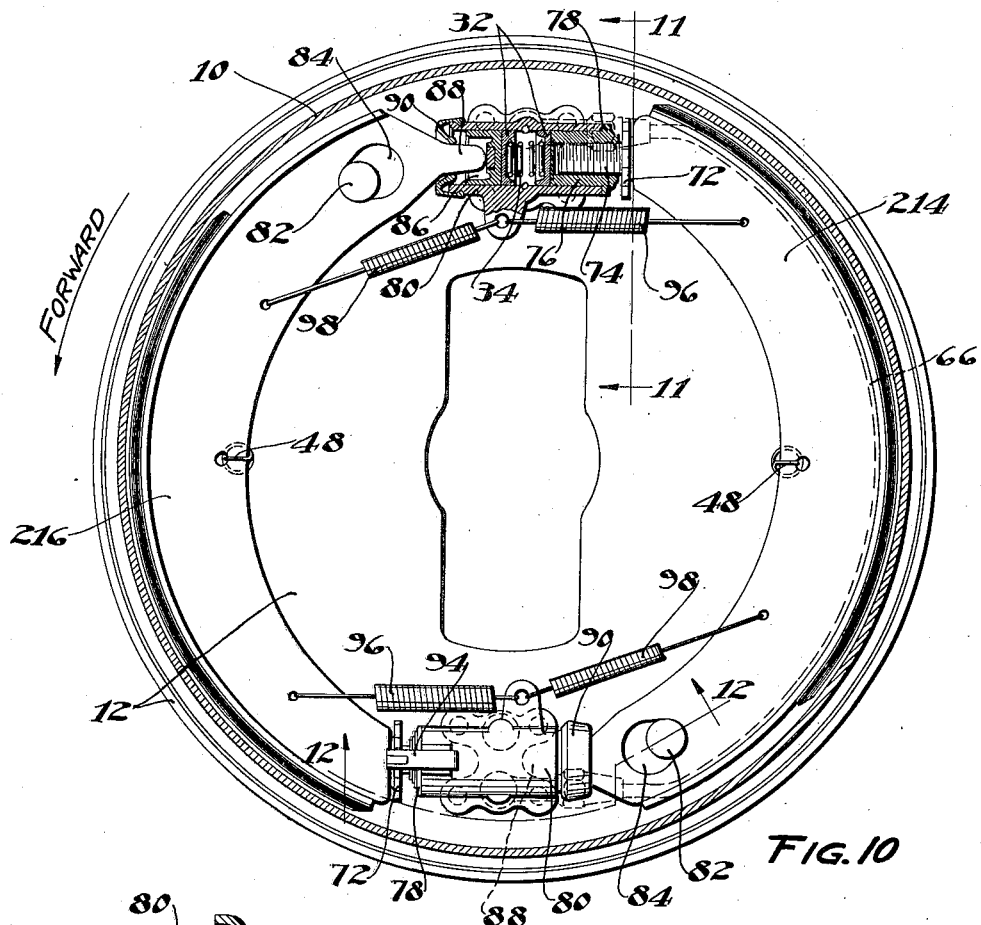
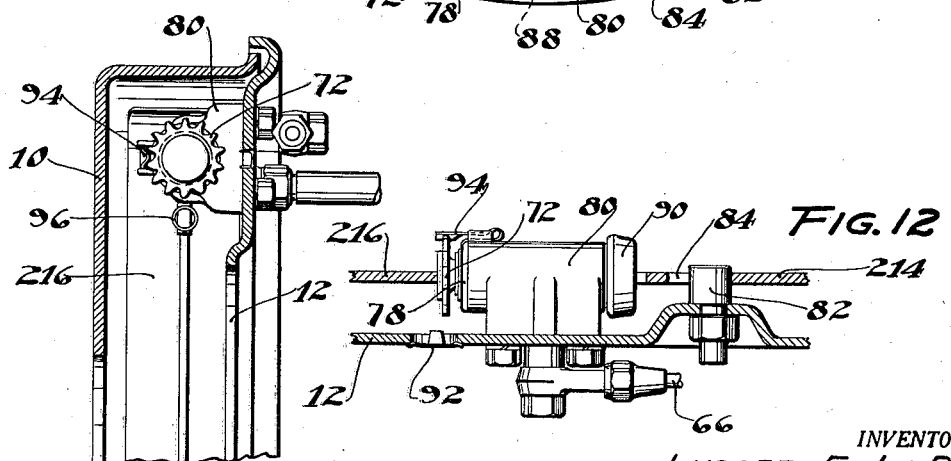
FIG. 10
FIG. 11
FIG. 12
INVENTOR.
LUDGER E. LA BRIE
BY
ATTORNEY.

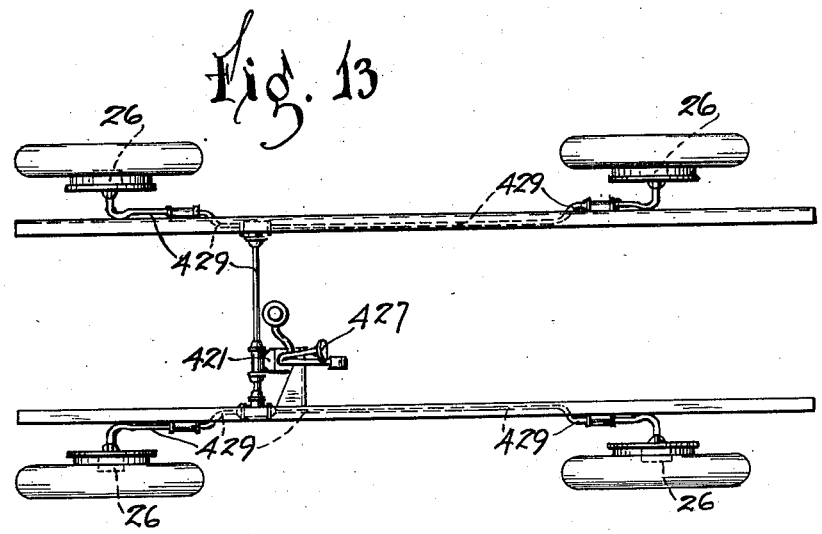
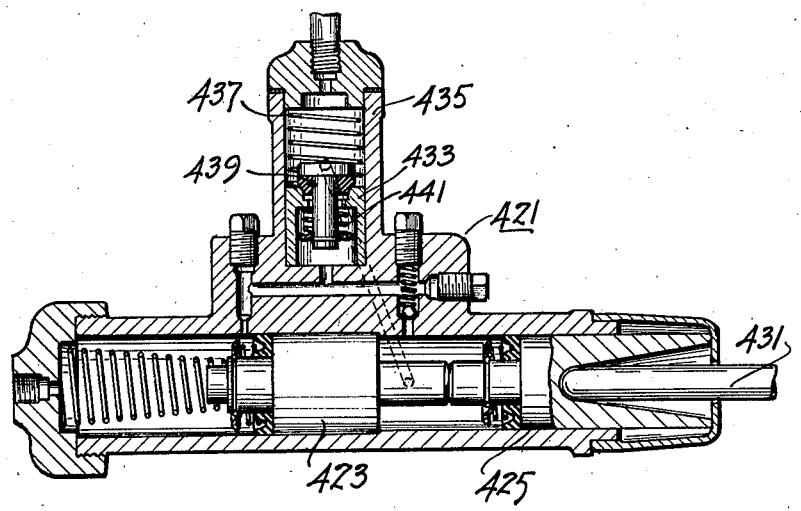

Patented Dec. 15, 1936

2,064,617

UNITED STATES PATENT OFFICE 2,064,617

BRAKE

Ludger E. La Brie, South Bend, Ind., assignor to Bendix Brake Company, South Bend, Ind., a corporation of Illinois

REISSUED

MAR 5 - 1940

Application April 23, 1931, Serial No. 532,265

17 Claims. (Cl. 188—79.5)

This invention relates to brakes, and is illustrated as embodied in a novel type of shiftable-anchorage automobile brake.

One feature of the invention relates to arranging for fluid-pressure application a brake of the type having a pair of floating or individually-shiftable shoes, i. e., arranged to shift individually from one anchor to another so that both shoes have self-energizing characteristics in both directions of drum rotation. Preferably there are two fluid-pressure operators adjacent the opposite ends of the shoes, and these operators in the forms illustrated in themselves embody a number of important features of novelty.

One important object relates to simplifying the wear adjustment of a brake of this type, by utilizing adjustable (i. e., expansible) anchors instead of attempting to adjust the shoes. This is especially desirable in combination with a fluid-pressure system of the well-known type, now practically universal commercially, in which a light pressure is maintained in the system even when the brakes are released, as the operating pistons under the influence of this light pressure follow the shoes out automatically as the anchors are adjusted. As this type of system always includes, in the master cylinder at the pedal, means for automatically keeping the system full of liquid, the adjusted released positions of the pistons are automatically compensated for in the master cylinder, and the anchor adjustments are therefore the only adjustments in the entire system, this not being true of any of the previously-known arrangements of wear adjustments for brakes of this type.

An important feature of the invention relates to eliminating shifting of the shoes on forward application, preferably by using a piston at the toe of each shoe which is larger in diameter than the piston at the heel, so that the return springs will hold the heels of the two shoes continuously anchored in forward application, although permitting the toes of the shoes to shift into engagement with the anchors on reverse application.

Other features relate to a novel duplex mechanical applying device capable of being used as an emergency connection from the usual hand lever when the above-described fluid-pressure brakes are used for service, to a simple and effective automatic adjustment for wear capable of embodiment in the wheel cylinders, and to various novel and desirable particular constructions and arrangements which will be apparent from the following description of the illustrative embodiments shown in the accompanying drawings, in which:

Figure 4 is a section corresponding to Figure 1, but showing a different brake, and with the mechanical operating means omitted;

Figures 1, 2, 3:
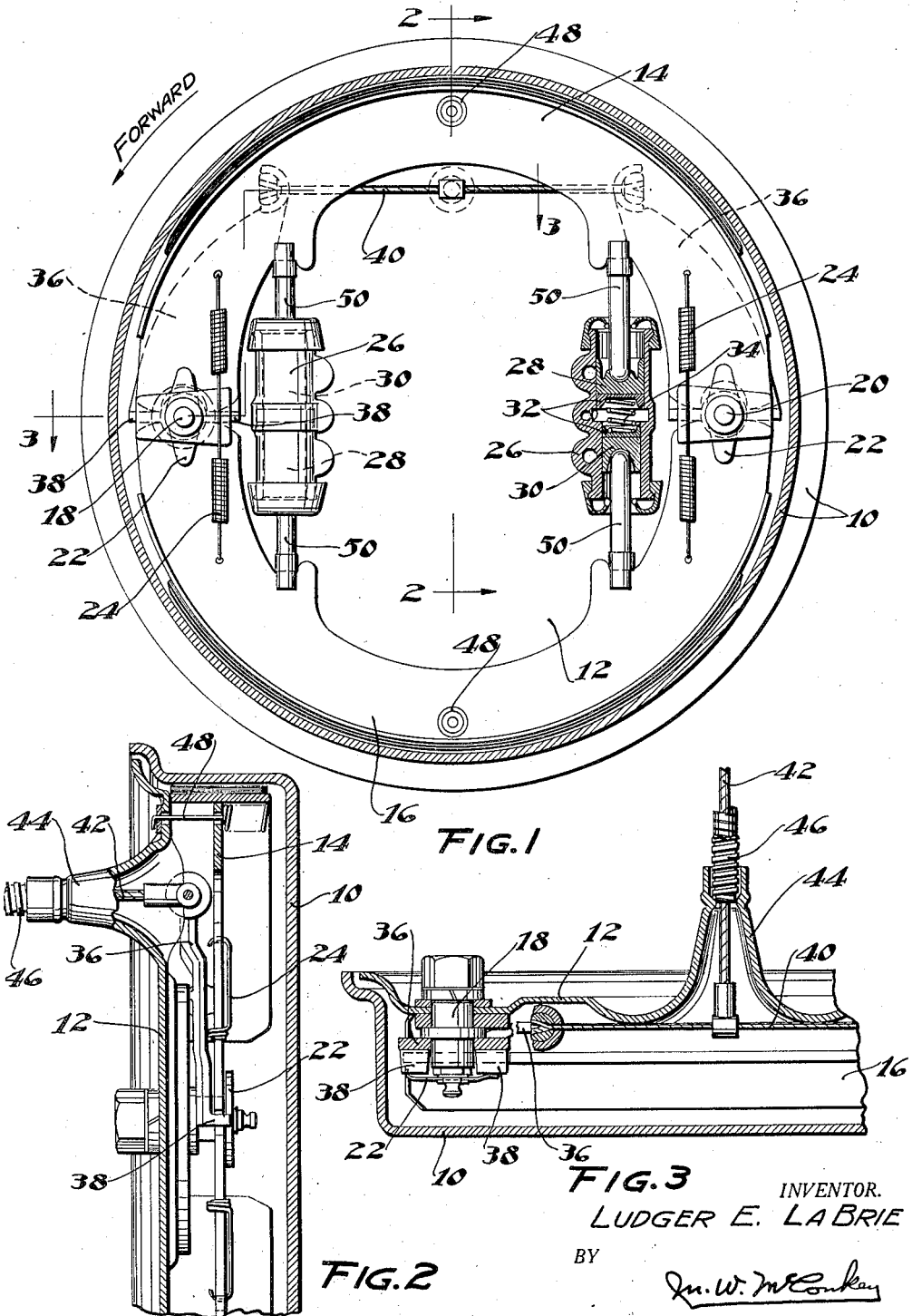
Figure 1 is a vertical section through a combination mechanical-hydraulic brake of the type described above, just inside the head of the brake drum, showing the brake shoes in side elevation.
Figure 2 is a partial section on the line 2—2 of Figure 1, showing the mechanical or emergency operating means.
Figure 3 is a section, at right angles to Figure 2, on the line 3—3 of Figure 1, and also showing the mechanical operating means.
Figure 7:
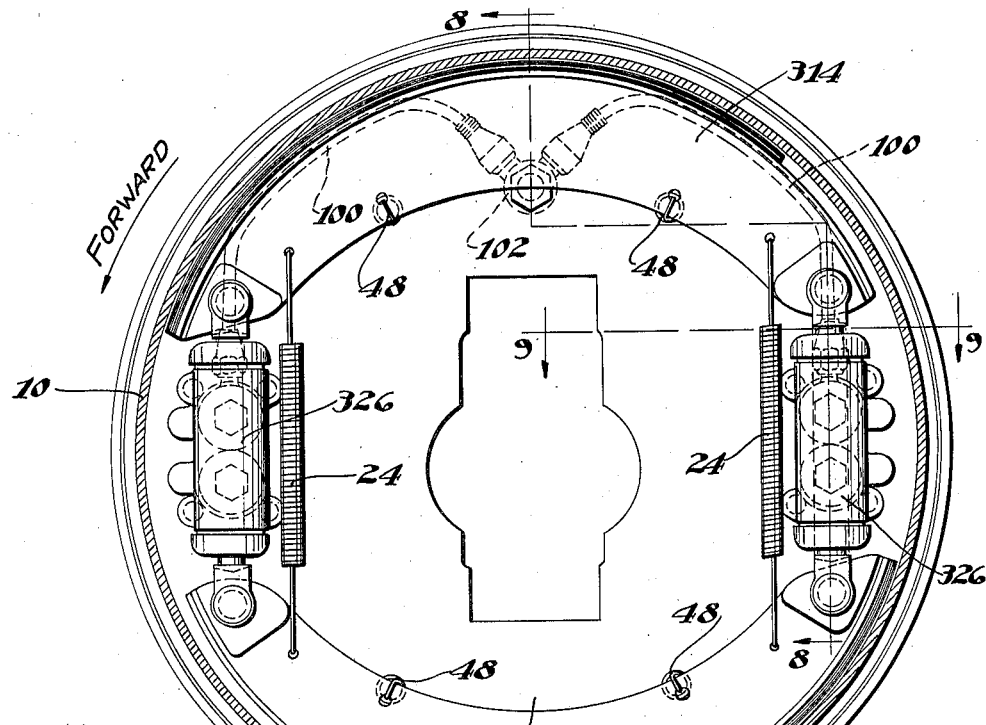
Figures 8, 9:
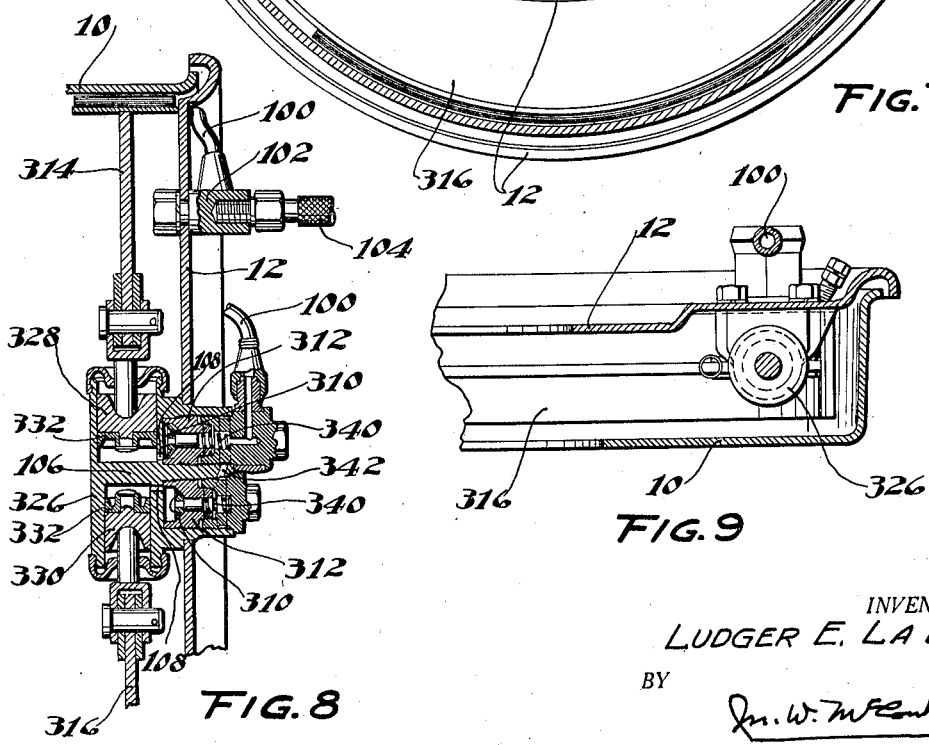

Figures 5 and 6 are sections through the brake of Figure 4, respectively on the lines 5—5 and 6—6 of Figure 4;

Figure 7 is a section corresponding to Figures 1 and 4, but showing a different brake;

Figures 8 and 9 are sections through the brake of Figure 7, respectively on the lines 8—8 and 9—9 of Figure 7;

Figure 10 is a section corresponding to Figures 1, 4, and 7, but showing a fourth brake;

Figures 11 and 12 are sections through the brake of Figure 10, respectively on the lines 11—11 and 12—12 of Figure 10;

Figure 13 is a more or less diagrammatic showing of a complete braking system according to my invention; and Figure 14 is a sectional view showing the master cylinder of Figure 13.

In the brake of Figures 1, 2, and 3, there is a rotatable drum 10, at the open side of which is a support such as a novel backing plate 12, and within which is arranged the brake friction means which in this case comprises a pair of floating and individually-shiftable shoes 14 and 16. The brake is provided at opposite sides with a pair of anchorages for the shoe ends, shown as a pair of anchor posts 18 and 20 carried by the backing plate and seated in notches in the ends of the shoes and provided with elongated retaining washers 22 engaging the sides of the shoes to hold them laterally (see especially Figure 3). Return springs 24 are tensioned between the shoes at their opposite ends.

The brake is applied by novel fluid-pressure means, which in this embodiment includes a pair of hydraulic wheel cylinders 26 secured to the backing plate adjacent each anchorage, and within each of which is arranged a relatively large-diameter piston 28 acting on the toe of one of the shoes (i. e., on the part of the shoe which leaves the anchorage during forward braking) and a relatively smaller-diameter piston 30 acting on the heel of the other shoe (i. e., on the part of the shoe which remains anchored on forward braking). The pistons may have suitable rubber packing cups 32, shown held by a light spring 34 compressed between them.

By this arrangement, since the springs 24 pull equally on the two shoes, and since the larger-diameter pistons 28 thrust outwardly with more power than the smaller-diameter pistons 30, with any given fluid pressure in the line and in the cylinders 26 between the pistons, the pistons 30 do not operate to shift the heels of the shoes away from their anchors at any time during forward braking, but merely move far enough to follow the shoes as shoe 14 pivots on anchor 18 and shoe 16 pivots on anchor 20. Thus during forward braking, due to the differential action of the pistons and the equal action of the return springs, the shoes remain continuously anchored instead of leaving the anchors and then coming back with a shock under load.

During reverse braking, the action is the same until the shoes engage the drum, whereupon the shoes shift to the opposite anchors under the influence of drum friction, the liquid-filled cylinders serving in a manner analogous to door checks to slow up the shifting and minimize shock.

For emergency application by the usual hand lever, especially when the brakes are on the rear wheels, the brake may have a pair of mechanical applying devices such as floating levers or cams 36 notched out to clear the anchors 18 and 20 and having thrust projections 38 extending at right angles therefrom between the ends of the shoes, the bodies of the levers being arranged between the backing plate and the web of shoe 14.

Levers 36 are operated by means such as a tension element or cable 40 connecting their upper ends and operated by a second cable 42 or the like secured approximately at its center. Cable 42 extends at right angles to the brake, through a tubular projection 44 integrally drawn in the backing plate and against the end of which engages and reacts the end of a flexible Bowden-type conduit 46 housing that part of cable 42 which is outside the backing plate.

In effect the drum 10 and backing plate 12 form a closed brake chamber housing the movable parts, and conduit 46 forms a flexible extension of the brake chamber housing the operating cable 42 or its equivalent. The other end of conduit 46 is in most cases secured to the chassis frame, and the cable 42 issues therefrom and is secured to any desired type of connection from the hand lever.

The shoes 14 and 16 may be held yieldingly in place by any suitable spring steady rests 48. The pistons are shown acting on the shoes through piston rods 50 rounded at their piston-engaging inner ends and slotted at their outer ends to embrace shoulders formed on the webs of the shoes.

In the arrangement of Figures 4, 5, and 6, shoes 114 and 116 are operated by the above-described differential-diameter pistons 28 and 30, against the resistance of the return springs 24, all as heretofore described. In this case, however, novel anchorages are provided which not only take the torque of the brake but which are also adjustable to compensate for wear of the brake lining. In the form illustrated in these particular figures, the anchors proper are two threaded posts 52 having conical or wedge heads 54 engaged by the conical ends of anchor links 56 pivoted to the ends of the shoes.

Links 56 pass, with sufficient clearance to permit them to shift slightly crosswise with a pivotal action on the anchor heads 54 during application and release of the brake, through sleeves 58 at opposite sides of housings 60 secured to the backing plate and into which the anchor posts 52 are threaded as shown in Figure 5. The tubular central portion of each housing may be closed by a stamping 62. Thus turning the posts 52 operates the wedges 54 to force links 56 slightly apart to take up for wear of the lining on the brake shoes. This is especially advantageous where the cylinders 26 are connected to a hydraulic system of the type, now universally used commercially, in which the fluid in the hydraulic lines is maintained under a light pressure of four or five pounds per square inch, insufficient to overcome springs 24 but sufficient to insure that no air will be sucked into the line.

A hydraulic brake system so arranged is disclosed in Figures 13 and 14 wherein is shown a master cylinder 421 having pistons 423 and 425 adapted to be actuated by a pedal 427 to force fluid under brake actuating pressure through conduit 429 to the cylinders 26 to apply the brakes. The pedal is connected to the pistons by pedal link 431. The fluid is maintained under predetermined pressure by a pressure maintenance piston 433 positioned in an auxiliary reservoir 435. Upon the piston 433 a spring 437 bears and with said piston there is associated a spring pressed relief valve 439. The liquid in the system is maintained under a pressure equal to the spring 441 associated with the valve 439.

With this type of fluid-pressure operating means, as the anchorages are adjusted to take up for wear, the pistons 28 and 30 are moved automatically outward by the line pressure, following the shoes to their new adjusted positions, and the master cylinder operates automatically, as described in my prior application, to introduce additional fluid into the lines to compensate for the new piston positions. Thus the only adjustments in the entire brake system which must be made by the driver are those at the two anchorages at each brake, and of course it is only necessary to adjust one of these two during any one brake adjustment.

Figures 5 and 6 also show a conduit 66 connecting the two cylinders 26, and a conduit 68 leading to the hydraulic lines on the chassis, which conduits do not appear in Figures 1-3, although of course they are used. Figure 5 also shows one of the removable set-screws 70 used in "bleeding" the hydraulic lines.

Figures 10, 11, and 12 show shoes 214 and 216 arranged to anchor slidingly at their heel ends against the plane end surfaces of adjustment star wheels 72 formed on adjustable thrust members or plungers 74 threaded into internally-threaded pistons 76 having shoulders 78 anchoring against the ends of cylinders 80 mounted on the backing plate and serving as parts of the brake anchorage as well as parts of the applying means.

The toe ends of the shoes are shown provided with separate eccentrically adjustable anchor posts 82 carried by the backing plate and seated when the brake is released in the small ends of pear-shaped openings 84 in the shoe webs. These ends of the shoes are acted on in applying the brake by plain pistons 86 in cylinders 80, the shoes having rounded thrust ends 88 passed through slots in guides or boots 90 mounted on the cylinders.

It will be seen that adjustment for wear is made at the anchorages by turning the two starwheels 72, the backing plate having openings opposite the starwheels to facilitate the adjustment, the openings having suitable removable covers 92. Pawls 94 of spring steel mounted on the cylinders yieldingly engage the starwheels and hold them in adjusted positions.

Instead of using pistons of different sizes, and to illustrate means partly equivalent to the differential-piston construction in brakes of the type covered by this application, I show in Figure 10 relatively strong return springs 96 tensioned between the heel ends of the shoes and stationary parts such as the cylinders 80 or the backing plate 12, and weaker return springs 98 tensioned between the toe ends of the shoes and the cylinders or backing plate.

Thus in applying the brake, during forward braking the springs 96 hold the heel ends of the shoes continuously anchored through engagement of shoulders 72 with the stationary cylinders, while during reverse braking the shoes open out with the heel ends anchored until the drum friction shifts them to cause the toe ends to anchor on the separate posts 82. During forward braking there is a radially-sliding anchorage permitting the shoes to adjust themselves to the drum, while during reverse braking there is sufficient power without such self-adjustment and the shoes pivot on anchor posts 82. In this construction, as in Figures 4-6, the light line pressures in the hydraulic lines when the brake is released hold the pistons against the shoe ends but cannot overcome springs 96 and 98.

In Figures 7, 8, and 9, the shoes 314 and 316 are actuated by pistons 328 of large diameter and pistons 330 of smaller diameter, all arranged in novel wheel cylinder devices 326 connected by branches 100 from a union 102 fed by the hydraulic line 104. The pistons are provided with suitable rubber packing cups 332, and act with differential pressures, as previously described, against the equal tensions of the return springs 24.

The novel wheel cylinder device 326 contains coaxial cylinders for the two pistons 328 and 330, which cylinders are however separated by a solid wall 106 and provided with separate inlets 108. The inlets 108 are controlled by cone valves 310 having stems loosely but guidingly sliding in passages in plugs 312 threaded into the side of the wheel cylinder device and seated against valve springs 340 which are light enough to be easily overcome by springs 24. The passages containing the valves are in open communication with each other through openings 342, and are also in open communication with conduit 100. The upper valve 310 is shown in brake-applied position in Figure 8, and the lower one in brake-released position.

In operation, brake-applying pressure on the line shifts the valves to the left in Figure 8, and this forces the liquid ahead of the valves into the cylinders below the pistons, the pistons 328 moving first because of their greater area. This causes the brake to be applied in the normal case, the shoes anchoring through engagement of pistons 330 with the wall 106.

If, however, the brake has worn so that it is not fully applied when the valves 310 reach their left-hand positions, additional liquid can flow past the valves, around their loosely-fitting stems, into the cylinders to cause full application of the brake. When the brake is now again released, valves 310 move to the right for a predetermined distance until they seat, whereupon the additional liquid so introduced is trapped in the cylinders and holds the shoes in automatically adjusted positions with predetermined clearance with respect to the drum. As explained above, the master cylinder at the pedal automatically forces more liquid into the system to replace that trapped in the wheel cylinders. The above-described adjustment introduces the additional liquid behind pistons 328 if it takes place during forward braking, and behind pistons 330 if it takes place during reverse braking.

While several illustrative embodiments have been described in detail, it is not my intention to limit the scope of the invention to those particular embodiments, or otherwise than by the terms of the appended claims. Some features of the present application are dominated by claims in Bendix application No. 522,220, filed March 13, 1931, and in Dodge application No. 532,298 and Sanford application No. 532,263 filed concurrently herewith, and it is not my intention to claim herein any of the subject-matter of said Bendix and Dodge and Sanford applications.

The inventions shown in Figures 1-3 inclusive are also disclosed and are claimed in my copending application 734,249, filed July 9, 1934, and the inventions shown in Figures 13 and 14 are also shown and are claimed in my copending application 499,921, filed December 4, 1930. The inventions shown in Figures 7 to 9 inclusive are also shown and are claimed in my copending application Serial No. 24,388, filed May 31, 1935, and the inventions shown in Figures 10 to 12 inclusive are also shown and are claimed in my copending application Serial No. 941, filed January 9, 1935.

I claim:

1. A brake comprising, in combination with a rotatable drum, a pair of shoes engageable with the drum and each arranged to anchor at one end when the drum is turning in one direction and at its other end when the drum is turning in the other direction, return springs acting on the shoes, a pair of adjustable anchorages one positioned between each pair of adjacent ends of said shoes, and fluid-pressure means for forcing the shoes against the drum to apply the brake and which fluid-pressure means in brake-released position is under a positive pressure less than the force of said springs to cause the fluid-pressure means to expand automatically to compensate for adjustment of the anchorage means but without overcoming the return springs.

2. A brake comprising, in combination with a rotatable drum, a pair of shoes engageable with the drum and each arranged to have one part anchor when the drum is turning in one direction and to have another part anchor when the drum is turning in the other direction, return springs acting on the shoes, a pair of adjustable anchorages each positioned between one pair of adjacent ends of said shoes, fluid-pressure means for forcing the shoes against the drum to apply the brake and additional springs inserted in said fluid pressure means exerting force to cause the fluid pressure means to expand automatically to compensate for adjustment of the anchorage means but without overcoming the return springs.

3. A brake comprising a pair of shoes, an anchorage for each adjacent pair of shoe ends, each of which anchorages is disconnectedly positioned between its adjacent pair of shoe ends to receive anchoring thrust therefrom and each of which anchorages is adjustable to compensate for wear of the shoes, return springs holding the shoes against their anchorages, a fluid-pressure applying device for each adjacent pair of shoe ends, and means for supplying fluid to said fluid pressure applying device in brake released position under a greater pressure than that of the hydrostatic head acting in brake applying direction but less than the brake releasing pressure of said springs.

4. A brake comprising a pair of shoes, an anchorage for each adjacent pair of shoe ends, each of which anchorages is disconnectedly positioned between its adjacent pair of shoe ends to receive anchoring thrust therefrom, return springs holding the shoes against their anchorages, and means comprising a fluid under positive pressure greater than that of the hydrostatic head but less than the brake releasing pressure of the springs, and fluid pressure applying devices maintained by said fluid under pressure in contact with the shoe ends while the shoes are in brake released position.

5. A brake comprising a pair of shoes each individually shiftable to anchor on one end in one direction of rotation of the drum and on the other end in the other direction of rotation of the drum, a pair of cylinders one adjacent each pair of shoe ends, and a pair of pistons in each cylinder and one of which is of greater diameter than the other and which act respectively on said shoes.

6. A brake comprising a pair of shoes, a pair of cylinders one adjacent each pair of shoe ends, a pair of pistons in each cylinder and one of which is of greater diameter than the other and which act respectively on said shoes, and a pair of anchorages one adjacent each pair of shoe ends.

7. A brake comprising a pair of adjustable wedge means at opposite sides of the brake, and a pair of individually shiftable shoes having parts at their opposite ends engaging said means both for positioning said shoes when the brakes are released and for anchoring the shoes when the brakes are applied, together with a pair of fluid-pressure applying devices acting on said shoes, one adjacent each anchor, each of said fluid pressure applying devices including a pair of piston means held in contact with the shoes both when the brake is being applied and when it is released.

8. A brake comprising a pair of adjustable wedge anchors at opposite sides of the brake, and a pair of shoes having parts at their opposite ends engaging said anchors, together with a pair of fluid-pressure applying devices acting on said shoes, one adjacent each anchor, each of said applying devices comprising a pair of oppositely acting pistons or the like of different diameters.

9. A brake having two fluid-pressure applying devices, each comprising a pair of oppositely-acting pistons or the like of different diameters.

10. A brake comprising a pair of floating shoes, a pair of anchors arranged between the opposite ends of the shoes, fluid-pressure applying means, and means embodied in said fluid-pressure means and holding one end of each shoe continuously anchored during forward application and permitting shifting of the shoes to the opposite anchors during reverse application.

11. A brake comprising a pair of floating shoes, a pair of anchors arranged between the opposite ends of the shoes, return springs acting on the shoes, fluid-pressure applying means also acting on the shoes, means comprising said springs and fluid pressure means for holding one end of each shoe continuously anchored during forward application and for permitting shifting of the shoes to the opposite anchors during reverse application.

12. A hydraulic brake system comprising a pair of shiftable shoes, fluid actuators for the opposite ends of the shoes, means for supplying the actuators with fluid under light pressure even when the brake is released and for supplying them with fluid under increased pressure to apply the brakes, and anchorages for the opposite shoe ends, at least one of which is adjustable to compensate for wear of the shoes, whereby the light pressure causes the actuators to follow up the shoes when the anchorage is adjusted to compensate for said wear.

13. A brake comprising a pair of separated shoes each engageable with the drum, each arranged to anchor at one end when the drum is turning in one direction and at the other end when the drum is turning in the other direction, and each having each end positioned adjacent to but separated from one of the ends of the other, a pair of anchors one positioned between each pair of adjacent shoe ends and with which said ends contact, said anchors being extensible to take up shoe wear and both contacting with both of said shoes independently so that either may be extended to take up shoe wear of both of said shoes and so that the entire brake may be adjusted by the extension of either anchor, and applying devices acting on said shoes, one adjacent each anchor.

14. A brake comprising a pair of separated shoes each having each end positioned adjacent to but separated from one of the ends of the other, a pair of anchors one positioned between each pair of adjacent shoe ends and with which said ends contact, said anchors being extensible to take up shoe wear, and fluid pressure applying devices acting on said shoes, one adjacent each anchor and each of said applying devices comprising a pair of oppositely acting pistons or the like of different diameters.

15. A brake comprising a pair of shiftable anchorage separated shoes each anchoring on one of its ends when applied while the drum is turning in one direction and anchoring on its opposite end when applied while the drum is turning in the opposite direction, means comprising a pair of anchorages one between each pair of adjacent ends of said shoes for both taking the torque of said shoes during braking and for positioning said shoes in their released position, means for adjusting each of said anchorages by a single operation so that both the return position and the anchoring position is adjusted and so that the entire brake may be adjusted by either of said anchorages, and applying devices acting on said shoes, one adjacent each anchor.

16. A brake comprising a pair of individually shiftable shoes, a pair of anchors interposed between the ends of said shoes, springs for maintaining said shoes normally against the anchors, a pair of double diameter cylinders interposed between the ends of said shoes, and a pair of pistons in each cylinder one of which is of greater diameter than the other and both of which exert force against said shoes.

17. A brake comprising a pair of shoes, a pair of anchors interposed between the ends of said shoes, springs for maintaining said shoes normally against the anchors, a pair of double diameter cylinders interposed between the ends of said shoes, and a pair of pistons in each cylinder one of which is of greater diameter than the other and both of which exert force against said shoes whereby said shoes remain with their forward ends against the anchor except in rearward braking.

LUDGER E. LA BRIE.